US006937539B2

(12) United States Patent
Kervern et al.

(10) Patent No.: US 6,937,539 B2
(45) Date of Patent: Aug. 30, 2005

(54) PROCESS FOR DETECTING MOBILES OBJECTS BY MEANS OF PASSIVE UNDERWATER BUOYS

(75) Inventors: Gilles Kervern, Plouzane (FR); Didier Billon, Brest (FR); Jean Le Gall, Le Conquet (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/467,799

(22) PCT Filed: Feb. 5, 2002

(86) PCT No.: PCT/FR02/00440

§ 371 (c)(1),
(2), (4) Date: Aug. 12, 2003

(87) PCT Pub. No.: WO02/067008

PCT Pub. Date: Aug. 29, 2002

(65) Prior Publication Data

US 2004/0071046 A1 Apr. 15, 2004

(30) Foreign Application Priority Data

Feb. 16, 2001 (FR) .............................. 01 02176

(51) Int. Cl.⁷ .............................. G01S 5/18; G01S 11/14
(52) U.S. Cl. ....................................... 367/129
(58) Field of Search ......................... 367/129

(56) References Cited

U.S. PATENT DOCUMENTS

| 5,058,081 | A | 10/1991 | Gulli et al. ................. 367/123 |
| 5,844,159 | A | 12/1998 | Posseme et al. ............ 89/1.13 |
| 5,886,950 | A | 3/1999 | Billon .......................... 367/88 |
| 6,304,513 | B1 | 10/2001 | Billon .......................... 367/88 |
| 6,704,246 | B1 | 3/2004 | Kervern ....................... 367/88 |
| 2004/0071046 | A1 * | 4/2004 | Kervern et al. ............. 367/129 |

FOREIGN PATENT DOCUMENTS

| FR | 2 688 595 A | 9/1993 |
| FR | 2 777 088 A | 10/1999 |
| FR | 02/02262 | 6/2002 |
| WO | 01 09639 A | 2/2001 |

* cited by examiner

Primary Examiner—Daniel Pihulic
(74) Attorney, Agent, or Firm—Lowe Hauptman & Berner, LLP

(57) ABSTRACT

The invention is a process relating to the processing of the signals sent by passive buoys dropped from an aircraft so as to compile EGP (Energy Geographic Plot) maps. The process is split into three steps: the first makes it possible to produce an EGP map of the x,y positions of the noise sources, the second makes it possible to associate the velocities $V_x, V_y$ with certain designated positions and the third makes it possible to eliminate the noise sources regarded as hampering the readability of the maps.

5 Claims, 2 Drawing Sheets

PROCESS FOR DETECTING MOBILES OBJECTS BY MEANS OF PASSIVE UNDERWATER BUOYS

The present invention concerns systems which make it possible to locate and identify underwater objects acoustically with the aid of a collection of passive underwater buoys.

It relates more particularly to the means for processing the reception signals of these buoys, which are generally transmitted by radio to a processing base usually situated on board an aircraft.

PRIOR ART

It is known practice for objects submerged under the sea, submarines for example, to be located via their noise by dropping passive acoustic buoys from an aircraft equipped for this purpose. Thus, in the French Patent filed under No. 9203005, on Mar. 13, 1992 in the name of THOMSON-CSF and published on Sep. 17, 1993 under No. 2 688 595, there is described a system for detection by means of an array of passive underwater buoys of the type known as "DIFAR" (Directional Frequency Analysis and Recording) and more particularly a processing process making it possible to locate several noise sources. This process is incomplete and does not in particular make it possible to determine the velocities of the noise sources. In this sense, the process does not make it possible to map a complete "EGP" map, EGP being the abbreviation standing for Energy Geographic Plot.

SUMMARY OF THE INVENTION

To complete this process, the invention proposes a process for detecting mobile objects by means of passive underwater buoys making it possible to obtain so-called EGP maps, each buoy allowing the formation of $N_v$ directive pathways, chiefly characterized in that the signals from the buoys are processed in three steps:

a first step (90–102) making it possible to obtain an EGP map of the x,y positions of the objects, a second step (110–120) making it possible to obtain an EGP map of the velocities Vx,Vy as well as an estimated spectrum for each arbitrary position x,y of the EGP map of the positions, these maps exhibiting the Doppler ambiguity loci, a third step (140–144) allowing the elimination from the maps of the objects regarded as strong sources of noise.

According to another characteristic, the first step consists in producing an EGP map of the positions by an iteration of operations of detection on the set of the frequency channels constituting the analyzed band, each detection being obtained by comparison of the generalized likelihood ratio with a threshold, and with each detection is associated a decisional summary containing the coordinates x,y, the signal-to-noise ratio SNR, the presence probability distribution for the maximum, representing a possible target or noise source, and, for each buoy, its relative contribution to the maximum.

According to another characteristic, the second step consists, for each detection on the EGP map of the positions emanating from the first step, in selecting the frequency channels that have participated in the detection by using the "presence probability distribution" datum, in merging the "SNR" data which correspond to these channels giving a global spectrum, in deducing the object's spectra seen by each buoy by using the "relative contribution" datum, in grouping together the spectrum-to-spectrum homologous frequencies, in calculating the average of these homologous frequencies thus giving a spectrum representing the spectral profile of the noise source supposedly placed at the maximum, in calculating the differential Dopplers between the buoys on the basis of this spectrum, making it possible to obtain the velocities $V_x, V_y$ corresponding to this detection, in iterating the procedure for all the detections and, at the end of the analyzed band in associating the velocities $V_x, V_y$ with the coordinates x,y so as to obtain an EGP map of the velocities.

According to another characteristic, the third step consists, for each noise source to be eliminated, which noise source is set on the EGP map of the positions, in again selecting the frequency channels, in estimating the power of the noise source so as to calculate the theoretical level of the signal originating from the noise source and in subtracting it from the actual level, in iterating this subtraction for each frequency channel so as, at the end of the analyzed band, to recommence the previous steps 1 and 2.

According to another characteristic, steps 1 and 2 are merged by iterating over the frequency channels, before performing the detection; the calculation of the differential Dopplers being taken into account in the detection criterion.

BRIEF DESCRIPTION OF FIGURES

Other features and advantages of the invention will become clearly apparent in the following description, presented by way of nonlimiting example with regard to the appended figures which represent.

DETAILED DESCRIPTION cording to the invention, the process chiefly comprises:

a data merge carried out over the collection of buoys by means of the likelihood ratio of the spectral observations, the use of differential Dopplers after estimation of the frequencies emitted, the canceling out of noise sources integrated into the previous spatial merge and Doppler processings.

Figure 1:
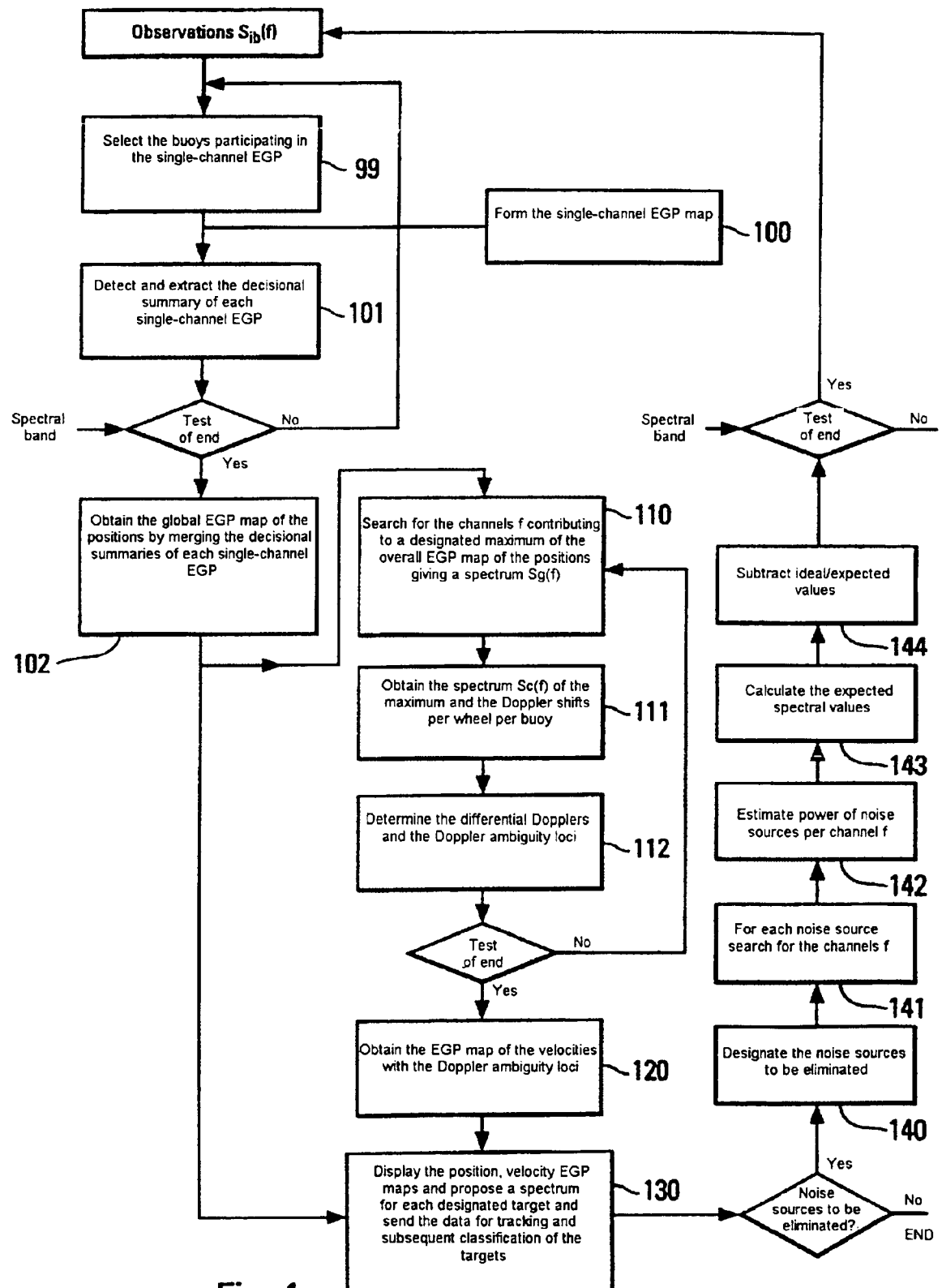
FIG. 1, a diagram of the process according to the invention.

FIG. 1 represents the processing of the signals provided by the DIFAR buoys and culminating, upon compilation of an EGP map of the positions and for each noise source, designated automatically or by the operator, in an EGP map of the velocities.

The input data consist of the normalized spectra (x/estimated mean) $S_{i,b}(f)$ with $1 \leq i \leq N_v$ (number of pathways)

$1 \leq b \leq N$ (number of buoys).

For each buoy, a sufficient number of pathways, for example $N_v \geq 6$, is formed so that the loss of detection due to the difference between the pointing direction and the bearing of the source is negligible.

According to the invention, the processing is performed in three steps:

step 1: determination of the positions of the noise sources;

step 2: determination of the velocity and of the spectrum of a few noise sources designated automatically or by the operator;

step 3: elimination of the strong sources of noise.

In step 1, for each frequency channel of the spectra, one commences by eliminating the spectral components of the buoys whose power level is insufficient in an operation 99. Thus, in the presence of a "strong spectral line", the buoys not receiving this spectral line on account of the Doppler effect are discarded so as not to bias the estimation of the position of the noise source by the maximum likelihood method. In the absence of any strong spectral line, the contributions from all the buoys are retained. To do this, the power of the signal received for a frequency channel is compared with a normalized threshold equal to the sum of the mean of the spectral noise and of the product of the test threshold chosen times the standard deviation of the spectral noise: a typical value of the test threshold is 4, the standard deviation equals $0.5227I \sqrt{N_{SI}}$. ($N_{si}$: number of integrated spectra) and the mean power of the noise equals 1.

One thus obtains a collection of spectral components, denoted $R_{i,b}(f)$ with $1 \leq b \leq M$, M being less than or equal to N if certain buoys do not overstep the threshold. This collection of spectral components constitutes the observation vector X for the relevant frequency channel.

Thereafter, in an operation 100, the square root of the generalized likelihood ratio of the observations is calculated, thus forming an $EGP_f$ map of the spectral channel f:

The expression calculated is:

$$I(x,y) = \frac{1}{\sqrt{2}} \frac{|(X-\Gamma)^T R^{-1} S|}{\sqrt{S^T R^{-1} S}}$$

in which:

X: vector of dimension $N_y.M$ of the spectral components $R_{i,b}$ $\Gamma$: vector giving the mean level of the noise on each pathway of each buoy $C^{-1}$: inverse matrix of the covariance of the observation for a single buoy such that:

$$R^1 = c_1^1 \cdots c_i^1 \cdots c_N^1 \cdots$$

$R^{-1}$ inverse matrix of the covariance of the observation over $N_y$ buoys.

S: vector of the values representing sensitivity of the various pathways of the various buoys for a target situated at a geographical position (x,y).

Next, in an operation 101, the detection of a target on the single-channel EGPf map is firstly performed and a "decisional summary" is thereafter compiled in respect of the latter map.

Detection consists:

in fixing a constant false alarm probability at each point of the $EGP_f$ map, in calculating a threshold $I_0$, independent of the position of the maximum, equal to the sum of the mean of the noise of the map and of the product of the test threshold times by the standard deviation of the noise of the map.

in searching for the maxima by thresholding with $I_0$.

The decisional summary associated with each detection consists of the following elements:

the coordinates x,y the signal-to-noise ratio SNR=(amplitude/standard deviation of noise )$^2$ the presence probability distribution for the maximum, that is to say the 0.95 probability boundary determined by the overstepping or otherwise of the threshold equal to max–k/max, k being a coefficient lying between 1.5 and 3 so as to take account of the discrepancies with respect to the expected statistics, the location of the maximum approximately following to a Woodward type procedure.

the relative contributions of each buoy, i.e. for a buoy the ratio between the level of the pathway pointing nearest to the maximum and the sum of these levels for all the buoys.

The processing corresponding to the operations 99, 100, 101 is repeated for all the frequency channels of the analyzed band, which may be of arbitrary width.

At the end of this step 1, by merging of the coordinates x,y of the decisional summaries, one obtains the global EGP map of the positions (102) of the objects thus located.

In step 2, one commences by searching, in an operation 110, over the collection, or over a part, of the maxima of the overall EGP map of the positions, for the frequency channels that have participated in the construction of each maximum. To do this, the datum relating to the presence probability distribution for the decisional summaries is used. If the position of the maximum is contained in the 0.95 probability boundary. The frequency channels indicate the various emission frequencies of the target that are observed by one of any of the buoys of the array. The set of channels participating defines a global spectrum of the object, all buoys included, such that Sg(f)=SNR(f), the values SNR(F) being chosen from the decisional summaries.

Next, in an operation 111, with the values of the relative contributions of each buoy, chosen from the decisional summaries, the object's spectra seen by each buoy are determined from $S_g(f)$, i.e.:

$$S_b(f) = S_g(f) \times \text{contribution } (b, f)$$

A grouping/pairing, from buoy spectrum to buoy spectrum, of the homologous frequencies that are shifted only by the Doppler effect is carried out thereafter. This is achieved by correlation of portions of the spectra $S_b(f)$ of the EGP maximum (and hence of the target). One thus obtains the Doppler shifts observed, for one and the same spectral line, for one buoy to the next, as well as by averaging an estimate of the frequencies emitted by the target $S_c(f)$.

The processing is continued by performing, in an operation 112, for each of the spectral lines or of the portions of strong level of the spectrum $S_c(f)$, the calculation of the differential Dopplers (frequency differences) observed between the buoys, making it possible to obtain the velocities $V_x, V_y$ of the object.

The Doppler ambiguity loci associated with each of the observed frequency differences are determined thereafter. These loci are bands parallel to the bisector of the angle formed by the two straight lines joining the position of the object to the buoys $b_i, b_j$. The width of these bands depends on the fineness of the frequency channels of the spectral analysis. Advantageously, each band is endowed with a maximum level equal to $S_{bi}(f) \times S_{bj}(f)$.

The processing corresponding to the operations 110, 111 and 112 is repeated for all the maxima selected on the EGP map. At the end of this step 2, by associating the velocities $V_x, V_y$ with the coordinates x,y of the maxima and by summing the Doppler ambiguity loci, one obtains the EGP map of the velocities of the objects located, with the Doppler ambiguity loci.

According to the invention, the process integrates the elimination from the EGP maps of the objects which are strong "sources of noise". The processing forms step 3. The latter consists of the following substeps:

designation in an operation 140 by the operator of the coordinates x,y of the noise sources to be eliminated on the EGP map of the positions, for each noise source in an operation 141, iteration of the scheme which corresponds to the operation 110, for each frequency channel, in an operation 142 estimation of the power of the noise source equal to $$\frac{\sqrt{SNR}}{S^T R^{-1} S}$$

where S is the vector representing the sensitivity of the pathways of the buoys for the position occupied by the noise source, SNR being a value preserved in the decisional summary, then, having regard to the estimated power and to the coordinates x,y of the noise source, in an operation 143 we calculate for each of the pathways of each of the buoys, the theoretical signal level originating from the noise source, providing a vector A of the expected spectral values, finally for a frequency channel, in an operation 144 calculation of the vector X-A which then replaces X.

The processing corresponding to operations 142, 143, 144 is repeated for all the frequency channels that have participated in the construction of the signal of the noise source. Once the frequency band has been explored, the processing of steps 1 and 2 is applied to the new observations until there are no longer any noise sources to be eliminated.

Figure 2:
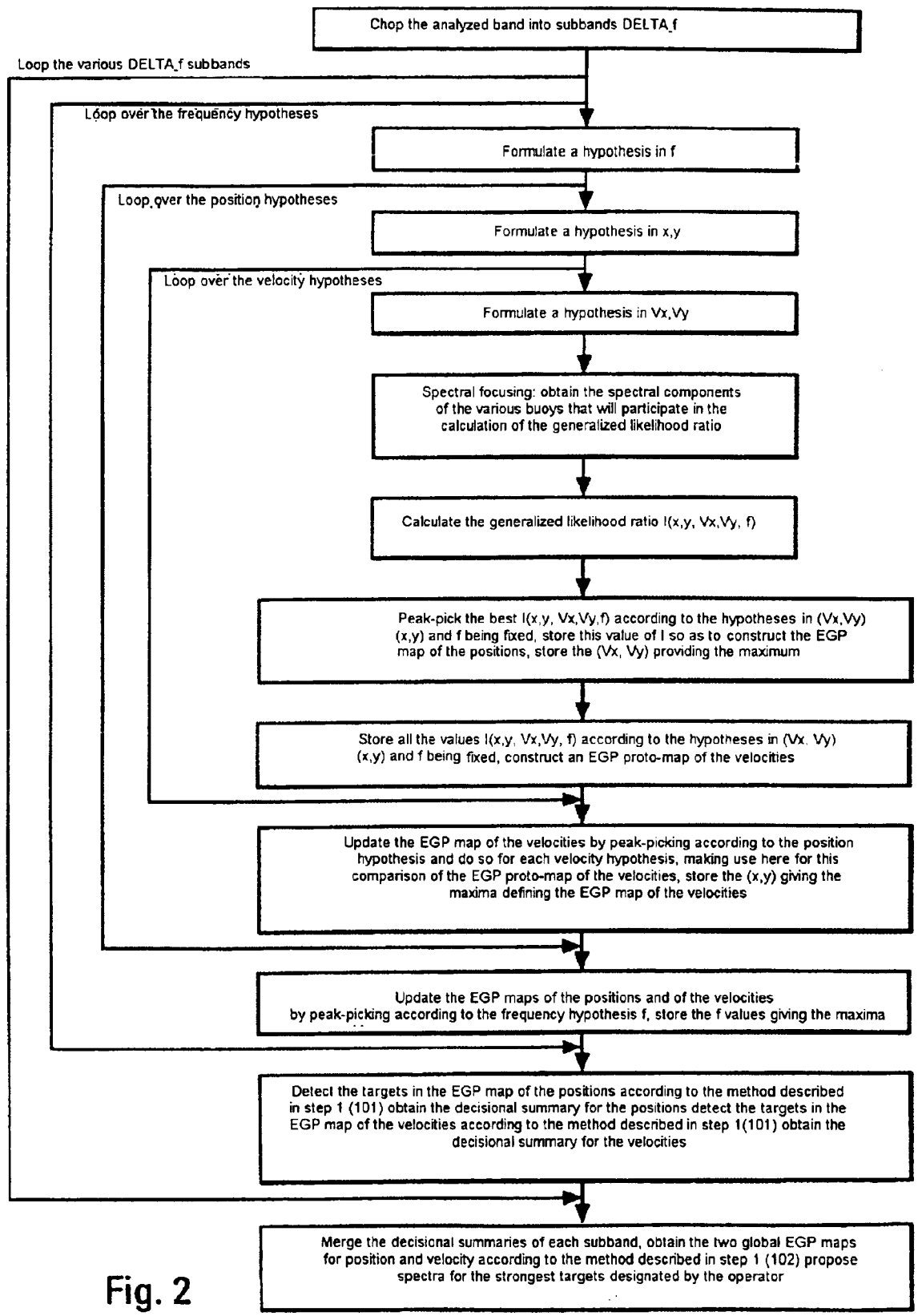
FIG. 2, a variant of this process.

According to a variant, steps 1 and 2 may be reduced to a single step along with an increase in the calculational burden. In this variant, the frequency merge is done before the detection and the differential Dopplers are taken into account in the detection criterion. FIG. 2 represents the flowchart of the variant which replaces in FIG. 1 the operations from 99 to 130.

In a spectral band $\Delta f$ at most a few tens of Hz wide, and slightly wider than the maximum expected Doppler shifts:

for each analysis frequency f belonging to the previous band $\Delta f$, for each position (x,y) in the EGP map, for a hypothesis $(v_x, v_y)$ of possible velocity of the noise source at this position (x,y), and all these hypotheses $\{f,(x,y), (v_x,v_y)\}$ will be scanned subsequently.

The Doppler shifts that ought to be obtained on the various buoys of the array are calculated and an observation vector of the buoy signals is reconstructed by selecting for each buoy the outputs of the spectral channels whose frequency is the noise source's supposed emission frequency to which the appropriate Doppler shift is added. Hence, an observation vector is formed here after a scheme carrying out a "spectral focusing" of sorts.

Once the observation vector has been obtained after spectral focusing, the EGP formation procedure is applied, $$I(x,y) = \frac{1}{\sqrt{2}} \frac{|(X-\Gamma)^T R^{-1} S|}{\sqrt{S^T R^{-1} S}}$$

as described previously in step 1, thus obtaining the value of the EGP map for the relevant hypotheses in terms of emission frequency, position and velocity of the noise source.

The result of the exploration of the scanned hypotheses is effected by the process known by the expression "peak-picking", which designates an operation of selecting a maximum from a collection of numbers, and two results are formed, one giving an EGP map of the positions ("peak-picking" as regards the frequency and velocity hypotheses), the other giving an EGP map of the velocities ("peak-picking" as regards the frequency and position hypotheses). The comparison of the two EGP maps, position and velocity, also makes it possible, by charting the various noise sources, to correctly associate position, velocity and frequency for one and the same noise source.

On the other hand, to explore a band B a few thousand Hz wide, possibly containing more than one hundred subbands of width $\Delta f$, which subbands are completely independent of one another a priori, the variant proposes that the following method be applied:

chopping of B into half-overlapping subbands $\Delta f$, formation of the multi-hypothesis EGP images peak-picked, in terms of position and velocity (as in the previous paragraph) for each of the subbands, detection of targets, if any, in the EGP images obtained on completion of the processing of each subband, as described at 101 in step 1; two decisional summaries are then obtained for each subband, merging of the detection results by using the decisional summaries of the detection in each subband, as described at 102 in step 1, representation of the two merged images of position and of velocity, by charting the various noise sources in such a way as to be able to associate position, velocity and frequency for one and the same noise source.

It will be noted that with this variant, it is possible to extract more than one target during the operation of detecting targets, if any, in the EGP images obtained on completion of the processing of each subband.

The subtraction of strong sources of noise is also done with this variant according to a similar scheme to that described for the initial EGP method.

What is claimed is:

1. A process for detecting signals coming from mobile objects and received by means of passive underwater buoys to obtain EGP maps, each buoy allowing the formation of $N_v$ directive pathways, wherein said signals received by said buoys are processed in the following steps:

a first step to obtain an EGP map of the x,y positions of said objects, a second step to obtain an EGP map of the velocities Vx,Vy and an estimated spectrum for any object with a position x,y on said EGP map of the positions, said map exhibiting some Doppler ambiguity loci, a third step to eliminate from the EGP map those of the objects regarded as strong sources of noise.

2. The process as claimed in claim 1, wherein the first step includes producing an EGP map of the positions by an iteration of operations of detection of maxima applied on a set of the frequency channels constituting an analyzed band, each detection being obtained by comparison of a generalized likelihood ratio with a threshold, each detection being associated with a decisional summary containing the coordinates x,y, the signal-to-noise ratio SNR of each maximum detected the presence probability distribution for each maximum representing a possible target or noise source, and, for each buoy, its relative contribution to the maximum.

3. The process as claimed in claim 1, wherein the second step include, for each detection on the EGP map of the positions emanating from the first step, in:

selecting the frequency channels that have participated in the detection by using said presence probability distribution datum, merging said data which correspond to these channels giving a global spectrum, deducing the object's spectra seen by each buoy by using relative contribution datum, grouping together homologous frequencies from spectrum-to-spectrum, calculating the average of these homologous frequencies thus giving a spectrum representing the spectral profile of the noise source supposedly placed at the maximum, calculating the differential Dopplers between the buoys on the basis of this spectrum, making it possible to obtain the velocities $V_x, V_y$ corresponding to this detection, iterating the procedure for all the detections and, at the end of the analyzed band, associating the velocities $V_x, V_y$ with the coordinates x,y so as to obtain an EGP map of the velocities.

4. The process as claimed in claim 3, wherein the third step includes, for each noise source to be eliminated, said noise source being located on the EGP map of the positions, selecting again said frequency channels, estimating the power of the noise source so as to calculate the theoretic level of the signal originating from the noise source and in subtracting it from the actual level, and iterating this subtraction for each frequency channel so as, at the end of the analyzed band, to recommence the previous steps 1 and 2 again.

5. The process as claimed in claim 1, wherein steps 1 and 2 are merged by iterating over the frequency channels, before performing the detection; the calculation of the differential Dopplers being taken into account in the detection criterion.

* * * * *